June 29, 1937.   C. H. SCHLESMAN ET AL   2,085,203
ENGINE INDICATOR
Filed Aug. 21, 1935    3 Sheets-Sheet 1
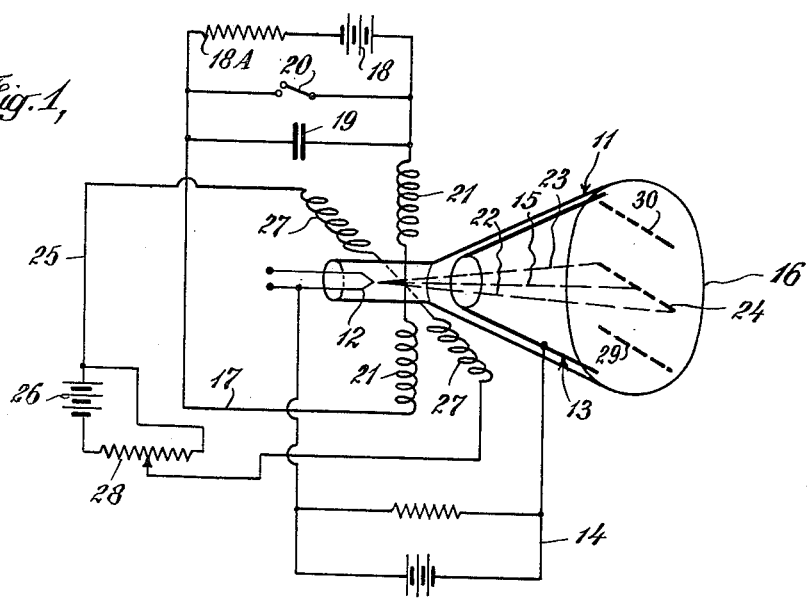
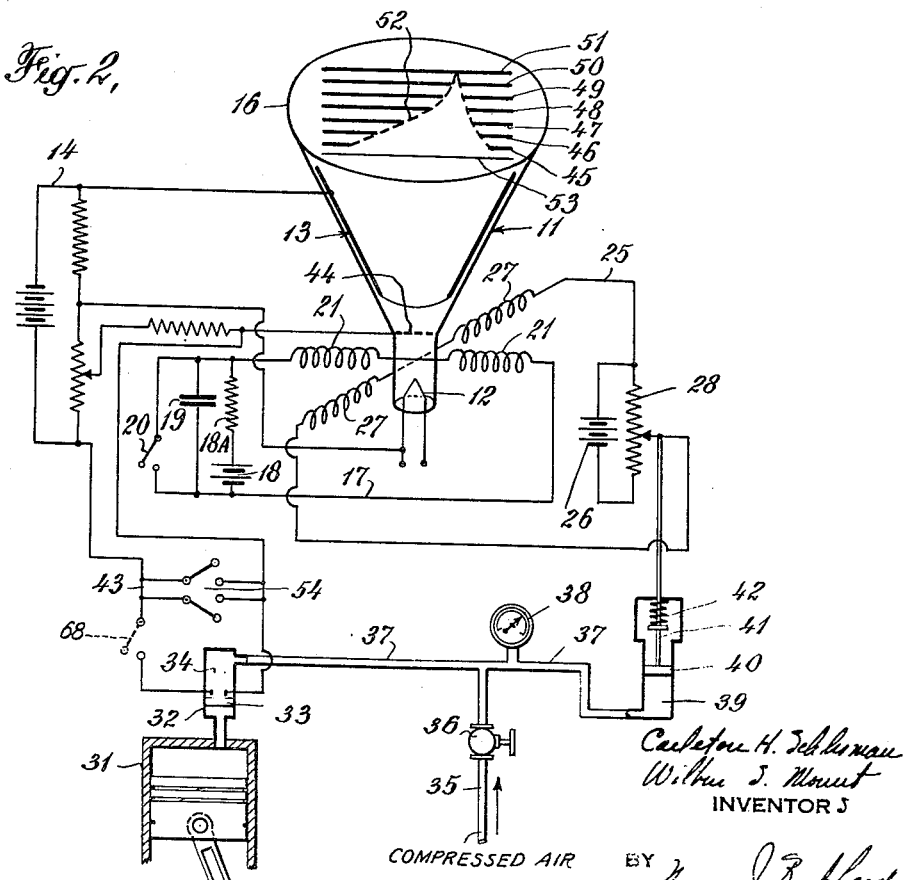

June 29, 1937.  C. H. SCHLESMAN ET AL  2,085,203
ENGINE INDICATOR
Filed Aug. 21, 1935   3 Sheets-Sheet 2
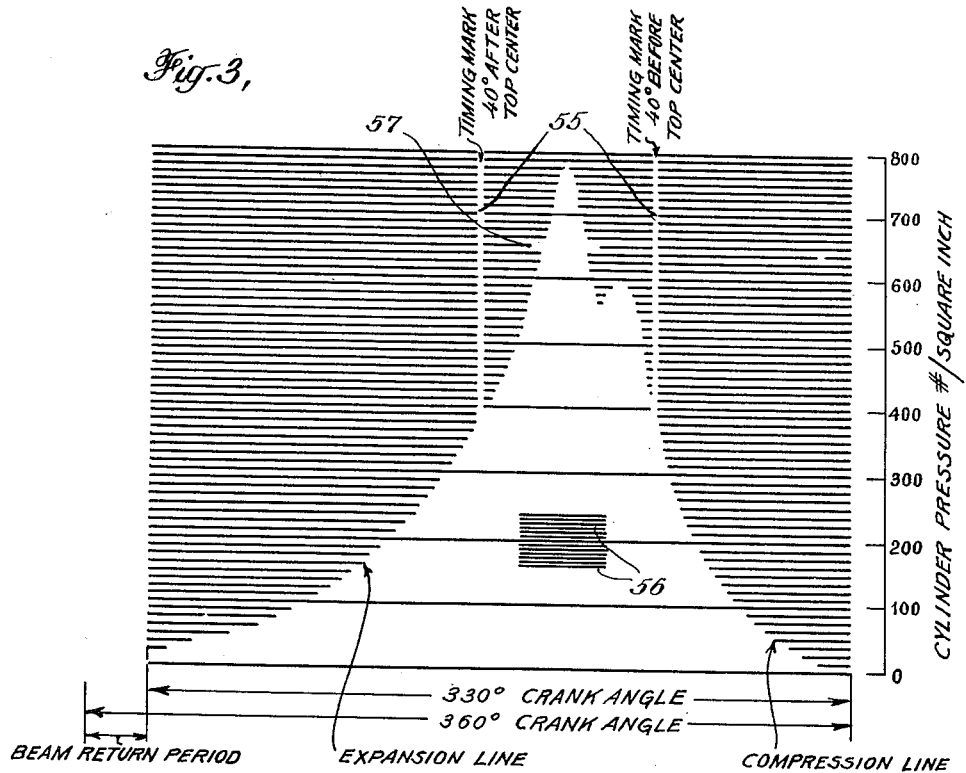
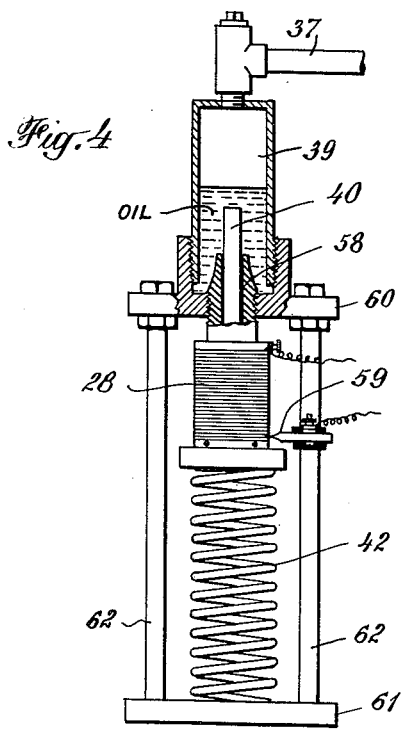
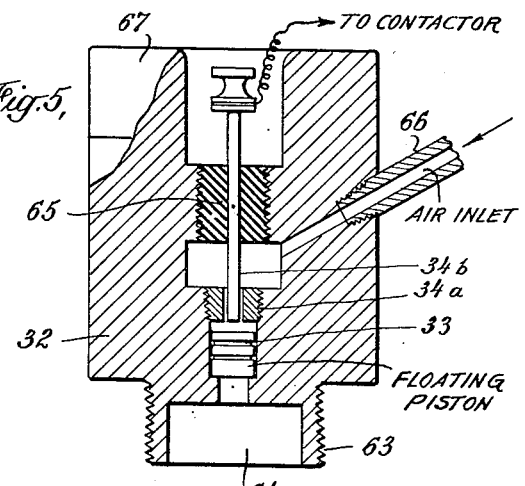

Fig. 6,
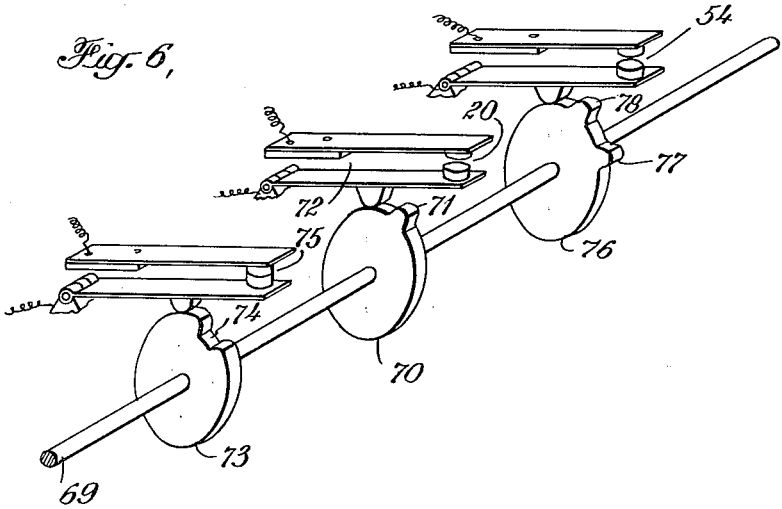
Fig. 7,
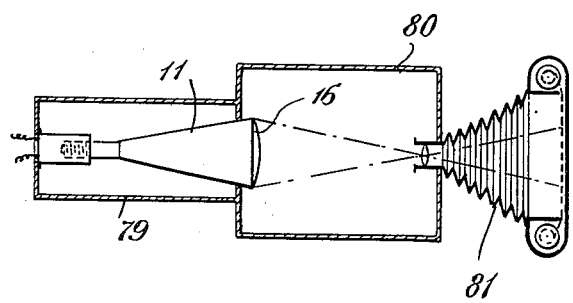

Patented June 29, 1937

2,085,203

UNITED STATES PATENT OFFICE 2,085,203

ENGINE INDICATOR

Carleton H. Schlesman, New York, and Wilbur S. Mount, Jackson Heights, N. Y., assignors to Socony-Vacuum Oil Company, Incorporated, New York, N. Y., a corporation of New York Application August 21, 1935, Serial No. 37,258

4 Claims. (Cl. 73—185)

This invention is directed to improvements in indicators for use on engines, for the purposes of recording the pressure and volume relations occurring in the cylinder during the operating cycle. It is specifically directed to an improved type of indicator capable of recording such conditions in a high speed engine, such as modern internal combustion engines.

Many difficulties have been had with previous types of indicators, due to inability to properly record the rapidly varying conditions within the cylinder without time-lags of so great a magnitude as to entirely vitiate the resulting record.

Typical prior art indicators fall into several classes, most of which have characteristics which lead to the previously mentioned difficulties and render them of doubtful utility and accuracy when applied to high speed engines. The commonest type of indicator is that employing a piston, pencil and rotating drum. These are competent on steam engines at slow speeds, but because of friction and inertia are entirely incapable of use at high speed. Various modifications of these instruments have been made, as shown by the following discussion, without completely solving the problem of accurate recording of cylinder conditions.

*Optical indicators.*—In this type of indicator the coil spring of the steam engine indicator has been replaced by a beam or diaphragm spring. The optical lever system has been substituted for the mechanical system of the pencil type. This indicator suffers from vibration if mounted upon the engine. If mounted upon a separate base, difficulty is experienced as a result of errors occasioned during transmission of cylinder pressure to the indicator through tubes and through the flexible drive to the indicator drum. The calibration of the indicator during operation is impossible and the exact phase of the recording drum is difficult to establish.

*Carbon pile indicators.*—These indicators, and others employing similar principles, consist of a carbon pile mounted upon the engine to which pressure is transmitted by means of a diaphragm and a calibrated spring. The calibration of this instrument has been found to change with temperature. Hysteresis in the carbon stack makes the record unreliable during detonation. It does not appear to be possible to build these indicators to record exceptionally high frequencies. This instrument suffers from the further disadvantage in that it requires the use of an air blast to cool the element during service.

*Sampling type indicators.*—In this type of indicator a small valve mounted on the cylinder allows a sample of the cylinder gases to pass through a steam engine type of indicator where an indicator card is constructed on the basis of several thousand samples taken during an equal number of engine cycles. This indicator suffers from valve leaks which are hard to overcome, from phase shifts as the result of a chain drive, and is generally difficult to operate. Attempts to improve the operation by the adoption of electrically operated sampling valves have introduced errors in timing which are serious.

*Balanced diaphragm indicators.*—Early indicators of the balanced type were very crudely made, the piston or diaphragm unit being massive, and hence, being unable to follow rapidly changing pressures. The early forms of instruments required up to twenty minutes for taking of a single card. More modern adaptations of this principle all suffer from serious defects. The most recent, the so-called M. I. T. indicator, has been developed to such a point that the electrical timing lag remains constant, although such lag has not been overcome. However, if the instrument is recording with a rising pressure, only a single point for each cycle of the engine will be printed as the device must be reset to record points representing the falling side of a pressure-time diagram. Hence the exact shape of the card is unknown, since all engines operate irregularly from cycle to cycle.

It is an object of this invention to develop an engine indicator capable of recording events without appreciable time lag, and capable of flexibility in searching out conditions within a high speed engine cylinder. A further object is the provision of such an instrument capable of making a permanent photographic record of its findings, capable of recording a plurality of points per cycle of operation, capable of calibration during operation, capable of simultaneously recording concurrent events in the engine cycle, incapable of influence by vibration of the engine, of high portability, and capable of operation at widely varying engine speeds. A further object is the development of an indicator actuated by electrical circuits wherein currents of extremely slight magnitude may be transmitted, and consequently inertia effects in the electrical circuits may be eliminated. Other objects and advantages are in part obvious and in part are set forth hereinafter.

Briefly summarized, these objects and advantages are obtained by a certain combination of a balanced pressure element and a cathode ray tube, the trace of the cathode beam being photographed.

In order that this invention may be more readily and completely understood, reference is now made to the drawings attached to and made a part of this specification. These drawings consist of Figure 1, showing a simple diagram of a cathode ray oscillograph; Figure 2, showing how it may be applied for the purpose here disclosed; Figure 3 shows an indicator card so secured; Figure 4 a pressure transmitting device; Figure 5 a contact closing device; Figure 6 a switch operating mechanism; and Figure 7, showing diagrammatically the setup used for obtaining a pictorial record. Figure 1 is a simple diagram of a cathode ray oscillograph adapted to the uses herein set forth. In this Figure 1, 11 is an evacuated tube, of conical shape indicated in perspective. Within this tube there is mounted a cathode 12, and an anode 13, which are included in and actuated by the circuit 14, the cathode giving rise to a beam or ray 15, which falls upon the enlarged end face 16 of the tube 11. The circuit 14 normally includes certain grids and the like mounted between the cathode 12 and anode 13 in the constricted neck of the tube 11 and used for focusing the beam, etc., but these are well known and are herein omitted for simplicity. To move the beam in response to the operating cycle of an engine, there is set up another circuit, 17, containing a power source 18, a resistance 18A, a capacity element 19, a shunting contact 20, and two actuating coils 21. The contact 20 is so arranged on some portion of the engine which completes 360° of revolution for each stroke of the piston so that it is open for almost all of the cycle, say 330°, and closed for a small portion, say 30°. Current flowing through the coils 21 and collecting in the capacity 19 will cause the beam to move in one direction through an angular distance, and the shorting of the circuit through closing of contact 20 will permit the beam to return to its starting point. In this manner, the beam 15 may be caused to pass from position 22 to position 23 once for each stroke of the piston, tracing a light path 24 upon the tube end 16, which light path may be photographed. In its return, the ray is best blanked out by any mechanical or electrical device which will open the circuit 14 during that portion of the cycle which is not to be recorded, although this movement is so rapid that the device can be used without such blanking device. The coils 21 and circuit 17 are arranged in known manner so that the speed of passage of the beam between 22 and 23 is constant. This portion of the device with modification hereinafter explained, will serve to record events during the cycle upon a time basis.

Since the time scale, or degrees of crank angle always bear a fixed relation to piston travel, these pressure vs. time indicator cards may be converted to pressure vs. volume indicator cards merely by applying to the time coordinate a volume scale suitable for the engine being investigated.

To secure a pressure basis, a second direction modifying circuit 25 is so mounted with respect to the cathode ray tube 11 that it serves to move the beam in a path disposed perpendicularly to the path caused by coils 21. This second circuit 25 includes power source 26, coils 27 and a rheostat 28, which rheostat is operated by a pressure equivalent to cylinder pressure in a manner later explained. The displacement of the beam in the vertical direction will be proportional to the current flowing in the rheostat 28 and so proportional to the cylinder pressure. This circuit will serve to displace the path of the light ray on tube end 16 which path is designated by 24, between the positions 29 and 30.

By means of these two directing coils 21—21 and 27—27, the beam 15 may be made to move over an area on tube end 16 which is in effect a coordinate chart, the time element of the cycle being expressed thereon by horizontal coordinates and the pressure element of the cycle being expressed by vertical coordinates. To record the travels of the beam, an ordinary camera may be set up, focused upon the tube end 16, the whole being enclosed in a light proof box, and the beam images on 16 may be photographed.

The operation of the instrument may be understood by reference to Figure 2. This figure is a diagram of an operating setup of the instrument. In addition to the parts already described in Figure 1 which are duplicated herein, it includes other features which are as follows: 31 designates the cylinder of the engine under test. In open communication therewith is placed a balanced pressure mechanism, consisting of a chamber 32, in which is mounted a freely floating piston 33 which may be forced by the cylinder pressure to touch contact points 34 and in closing them, close circuit 43, the action of which will be later explained. The floating piston 33, may be kept from closing these contacts until a desired pressure has been reached in the cylinder 31 by forcing it away from the contacts 34 by means of air pressure behind it. This pressure is supplied by compressed air admitted through pipe 35, controlled by valve 36 and transmitted to the piston chamber through pipe 37. The magnitude of this pressure may be observed by a gauge 38, and is recorded in the instrument by transmission into chamber 39, where it moves plunger 40 against the restraint of spring 42 and the position of the plunger transmitted through rod 41 controls the position of the contact on rheostat 28 and causes the recording of the pressure magnitude by the oscillograph in a manner already explained. Returning to the balanced pressure element 33, when contacts 34 are closed, they serve to actuate circuit 43, which imposes a voltage on grid 44 placed in the tube 11 in front of the cathode 12, and so cuts off the ray and prevents it from reaching 16.

Now assuming engine cylinder 31 to be operating, the manner of securing an indicator card may be illustrated as follows: 10# gauge pressure (for example) is admitted back of 33, and as soon as the pressure in the cylinder exceeds 10#, contacts 34 are closed, opening again when the pressure in the cylinder drops below 10#. The beam traces line 45, which is interrupted during the period when 34 is closed, and is consequently in two parts. Similarly at pressures of 20#, 30#, etc., we may trace lines 46, 47, 48, 49, 50, and 51. Each line, it may be noted, has a gap of varying magnitude in its middle. A line 52 may be imagined as joining the broken ends of these lines, and that line 52 will be the pressure-time line for the indicator card, the area between this line 52 and a base line 53 corresponding to the usual indicator card. The actual card, it will be understood, will be taken by photographing the various paths of the light ray, as previously explained. For purposes of calibrating, a switch 68 may be placed in circuit 43. When this switch is manually opened, the grid 44 cannot be actuated by contacts 34, and as a result, a continuous line is drawn on the indicator diagram for the pressure then obtaining.

To make this more clear, in Figure 3 there is shown a typical indicator card as it would appear in the negative on the film of the recording camera. This figure is largely self-explanatory in the light of the foregoing discussion, except for the following features. The indicator card is one for the operation of a Diesel engine. For correlation of the indicator card with cycle events, other features have been added to those heretofore discussed. Circuit 43 as shown on Figure 2 has been expanded to include two more switches such as shown at 54 on that figure. These are actuated by some appropriate moving part of the engine, and adjusted so that one will close momentarily when the cycle reaches a position 40° before top center, and the other when it reaches a point 40° after top center. These short out the contacts 34 when closed, and cause a small break in the ray, which appears in the indicator card negative as a vertical white line, as indicated at 55.

Any other event of the cycle which has a relation either of pressure or time can be properly recorded by means of suitable switches, etc. and pressure transmitters. For example, in the Diesel engine indicator card of Figure 3, we might arrange contacts to show the duration of fuel injection and its position in the cycle, as indicated by the lines 56. In a spark ignition engine, the exact time of sparking with respect to the cycle may easily be indicated by similar means. Another application of importance is in the investigation of pressure vs. time conditions in the feed injection system of Diesel engines and the like. Study of these and analogous operations can be made quite readily since the instrument is applicable to searching into any operation wherein pressure and time are found in cyclic relation.

In the ideal indicator card of Figure 3, the expansion and compression lines formed by the ends of successive broken pressure traces are quite regular. In the actual card, it will be found that these lines are fully regular at their low-pressure extremities. At high pressures, particularly near the peak and in the general region representing fuel combustion, the actual diagrams are more irregular than the ideal of Figure 3. Each individual line on Figure 3 represents conditions during one single cycle of events. The indicator card is composed of the average of as many cycles of events as there are horizontal lines on that card. We are interested in two things, and we can find each from this card. The line drawn through the average endings of the horizontal line tells us the conditions during the average cycle. The distance any particular cycle line deviates from this average, as indicated at 57 in Figure 3, tells us how much the individual cycles differ from the average. A very ragged line indicates great variation in individual cycles and is indicative of irregular operation.

Figure 4 shows in detail one form of the pressure transmitting rheostat indicated by 28 in Figures 1 and 2. In Figure 4, 39 is a cylinder, to which the pressure behind the balanced pressure element is transmitted through pipe 37. The cylinder 39 contains a piston 40, working through a gland 58. The cylinder 39 is filled with oil to a level above the upper end of piston 40, and the air pressure from pipe 37, transmitted through the oil, causes piston 40 to move against the resistance of spring 42, carrying with it the rheostat coil 28, past the stationary contact point 59. The entire assembly is held together by upper and lower collars 60 and 61, spaced on bolts 62. The spring 42 is preferably one with a linear calibration characteristic, such that it is compressed an equal amount for an equal increment of load at any point in its range. This permits the use of normal winding of the rheostat coil 28. Of course it is possible to use other springs, and vary the winding of the rheostat to compensate.

Figure 5 will serve to illustrate one form of balanced pressure mechanism and will serve typically to explain all. In Figure 5, 32 indicates a chamber, capable of attachment by threaded extension 63 into any appropriate opening of a cylinder so that the interior chamber of 32 is in open communication with the interior of the cylinder through passage 64. In the internal passage in 32, there is mounted a freely floating piston 33 which travels vertically in a direction dependent upon the difference in pressure imposed upon its top and bottom. When the cylinder pressure exceeds the balance pressure, the piston 33 at the top of its travel rests upon and closes the circuit between contacts 34a and 34b. 34a is a ring embedded in the material of chamber 32 and is in circuit by the usual means of grounding one lead to circuit 43 (shown in Figure 3) to the engine body. 34b is a rod, extending downwardly through and held in place by an insulating plug 65, and the other lead of circuit 43 is connected to the outboard terminal of 34b. Balance pressure is applied to the piston 33 through fitting 66, compressed air entering through 66 passing down through the annular space between contacts 34a and 34b. The upper end of 32 is hexagon formed for wrench engagement, as at 67.

A convenient method of operating the various contact switches and event markers and the like is shown in Figure 6. In this figure, 69 is a camshaft, which may be either an extension of the crankshaft of the engine, or of the camshaft of the engine, or an independent shaft geared or fixed to either of the above in such a manner that it rotates in absolute synchronism with the crankshaft. To operate contact switch 20, which should be open say 330 degrees of revolution and closed 30 degrees, we may mount cam 70 on shaft 69. Cam 70 has lug 71, extending through 30 degrees of its periphery, and operates arm 72 to close switch 20 during 30 degrees of revolution. To blank out the oscillating beam 15 during these 30 degrees of revolution, cam 73 may be mounted on shaft 69, having a 30-degree depression 74, serving to open switch 75, which switch 75 may be included in the beam circuit 14 of Figures 1 and 2. To record other events, as for example the "40-degree off dead center" points of Figure 3, a third cam 76 may be used, with properly located points 77 and 78, serving to close the normally open switch 54. It is obvious that any desired number of events may be recorded in this manner by suitable cams operating switches interposed in the proper circuits. Similarly, any engine accessory having a moving part may be utilized, as for instance, the motion of the spring rod in a Diesel injection valve may be utilized to operate a contact and secure the recording of the lines 56 of Figure 3. Figure 7 shows in diagram the manner of securing a record. The oscillograph tube 11, encased in its usual protective sleeve 79 is mounted with the fluorescent end screen 16 inside of a light-proof box 80, at the other end of which is placed a camera 81, focused upon the screen 16.

It will be observed that the instrument herein disclosed is connected to the engine only by flexible wires, of small size, and is consequently capable of being so mounted as to be entirely free from engine vibrations. The pressure transmission rheostat of Figure 4 is preferably connected to the balanced pressure mechanism by flexible tubing for the same reason. When so connected, engine vibrations are absolutely without effect upon the accuracy of this instrument. The only parts mounted on the engine are the balanced pressure device and one or more contacting devices, none of which are affected by vibration.

Of great importance is the fact that this instrument is able to record a point for each rising or falling of cylinder pressure past a predetermined value, and is so enabled to record both rising and falling sides of a normal card as well as intermediate fluctuations, and also may be modified readily to record more events during that cycle if desired. No instrument previously known to us has been capable of accurately recording a number of closely adjacent events per cycle, and the immense advantages arising from this capability are obvious.

The indicator possesses further advantages in that the contact making devices do not transmit any measurable current, and the electrical circuits may be designed to have virtually no inertia. The second of these permits great speed of response, and the first permits the use of very high light intensities in recording, a limitation which has not been overcome by indicators using neon tubes. As a consequence of the possibility of high light intensities, it is possible to record indicator cards upon standard roll film in a camera of usual type focused upon the oscillograph, thus dispensing with the usual recording drum which must be loaded in a dark room.

The instrument disclosed herein has been found fully flexible with respect to speed, and may be used with equal ease for speeds of 30 or 10,000 R. P. M.

The number of lines making up the indicator card can be controlled at will, many overlapping lines being employed for studying cyclic variations, while a few lines, which overlap only at the single point of immediate interest upon the indicator card may be employed for a study of other phenomena.

Provision may be made for calibrating the instrument while in operation, and for marking upon the indicator card reference points relating to both pressure and to phase angle.

It is capable of obtaining a permanent photographic record using the ordinary commercial variety of daylight loading roll film.

The instrument may be operated by an unskilled operator and requires only the usual sources of power, such as 110 volt alternating current, for its operation.

This instrument may of course be modified to examine any cycle of events wherein pressure varies with time in a repetitious manner, such as the performance of compressors and pumps, the conditions in the feed mechanism of Diesel engines, any internal combustion or expansion heat engines, and the like. The necessary modifications to permit of these uses are believed to be within the purview of the invention here disclosed, and the invention is not to be limited by the specific discussion in the foregoing, but only by such limitations as are expressed in the claims.

We claim:

1. Means of examining a series of cycles of events wherein pressure varies in repetitious manner with respect to time; comprising a cathode ray tube, means to cause the ray of said tube to sweep regularly through a path of predetermined length representing a unit cycle of time, means to alter the position of said path in a direction perpendicular to its length in response to a pressure change and through a distance proportional to said pressure change, and means to interrupt said ray whenever the examined pressure is equal to or in excess of the altering pressure.

2. Means for examining a series of cycles of events wherein pressure varies in repetitious manner with respect to time; comprising a cathode ray tube, means to cause the ray of said tube to sweep regularly through a path of predetermined length representing a unit cycle of time, means to alter the position of said path in a direction perpendicular to its length in response to a pressure change and through a distance proportional to such pressure change, means to interrupt said ray whenever the examined pressure is equal to or in excess of the altering pressure, and means to record the successive paths of said ray and the interruptions therein.

3. Means for examining a series of cycles of events wherein pressure varies in repetitious manner with respect to time and other events which may be noted occur repetitiously, as in the cycle of an internal combustion engine; comprising a cathode ray tube, means for causing the ray thereof to sweep regularly through a path of predetermined length and position representing a unit cycle of time, means to alter the position of said path in a direction perpendicular to its length in response to a pressure change and through a distance proportional to said pressure change, means to interrupt said ray when the examined pressure is equivalent to the altering pressure, means to interrupt said ray when other cyclic events occur, and means to record the successive paths of said ray and the interruptions therein.

4. Means for examining the operation of a reciprocating heat engine, and obtaining an indicator diagram therefrom which comprises a cathode ray tube, means for causing the ray thereof to sweep regularly through a path of predetermined length and position representing one revolution of the crank of said engine, means for altering the position of said path in a direction perpendicular to its length in response to a pressure change and through a distance proportional to said pressure change, means for marking the point in the cycle where the cylinder pressure is equivalent to the path-altering pressure, said last named means serving to cut off said ray at the instant of equivalency of pressures when cylinder pressure is rising and to restore said ray at the instant of equivalency when cylinder pressure is falling, means to momentarily interrupt said ray to signal the occurrence of other cycle events of which knowledge is desired, and means to record said successive positions of the ray-path and the interruptions therein.

CARLETON H. SCHLESMAN.
WILBUR S. MOUNT.